(12) United States Patent
Cha et al.

(10) Patent No.: US 10,132,646 B1
(45) Date of Patent: Nov. 20, 2018

(54) MEASURING DEVICE FOR AMBULATION DATA

(71) Applicant: KOREA INSTITUTE OF SCIENCE AND TECHNOLOGY, Seoul (KR)

(72) Inventors: Youngsu Cha, Seoul (KR); Doik Kim, Seoul (KR); Junku Yuh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/848,469

(22) Filed: Dec. 20, 2017

(30) Foreign Application Priority Data

Aug. 7, 2017 (KR) .................. 10-2017-0099723

(51) Int. Cl.
*G01C 22/00* (2006.01)
*G01L 1/16* (2006.01)
*G01B 7/16* (2006.01)
*A43B 3/00* (2006.01)

(52) U.S. Cl.
CPC .......... *G01C 22/006* (2013.01); *A43B 3/0005* (2013.01); *G01B 7/16* (2013.01); *G01L 1/16* (2013.01)

(58) Field of Classification Search
CPC ............................... G01C 22/00; G06F 17/00
USPC ................................................ 235/105, 375
See application file for complete search history.

(56) References Cited

U.S. PATENT DOCUMENTS

| 8,384,551 | B2 | 2/2013 | Ross et al. | |
| 9,089,182 | B2* | 7/2015 | Schrock | A43B 3/00 |
| 2006/0195197 | A1 | 8/2006 | Clausen et al. | |
| 2007/0247306 | A1* | 10/2007 | Case, Jr. | A43B 3/0005 340/539.11 |
| 2008/0203144 | A1* | 8/2008 | Kim | A61B 5/00 235/105 |
| 2010/0152621 | A1* | 6/2010 | Janna | A61B 5/0031 600/595 |
| 2010/0191153 | A1* | 7/2010 | Sanders | A61B 5/1038 600/587 |
| 2011/0054359 | A1* | 3/2011 | Sazonov | A43B 3/0005 600/595 |
| 2011/0077904 | A1 | 3/2011 | Jung et al. | |
| 2011/0153261 | A1* | 6/2011 | Jang | A43B 3/0005 702/141 |
| 2011/0230273 | A1* | 9/2011 | Niegowski | A43B 3/0005 473/199 |

(Continued)

FOREIGN PATENT DOCUMENTS

| JP | 60-200120 A | 10/1985 |
| KR | 20-1994-0002468 Y1 | 4/1994 |

(Continued)

*Primary Examiner* — Edwyn Labaze
(74) *Attorney, Agent, or Firm* — Rabin & Berdo, P.C.

(57) ABSTRACT

Disclosed is a measuring device for ambulation data including a bending sensor installed in a bottom of a shoe to sense a bending signal transmitted by bending of the bottom of the shoe and generate a voltage signal while a user is walking, a control unit electrically connected to the bending sensor to derive an ambulation parameter by processing the outputted voltage signal, and a terminal to output the ambulation parameter transmitted from the control unit, wherein the bending sensor is placed between a part that touches a forefoot and a part that touches a heel in the bottom of the shoe.

4 Claims, 10 Drawing Sheets

(56) References Cited

U.S. PATENT DOCUMENTS

| | | | | |
|---|---|---|---|---|
| 2012/0255160 | A1* | 10/2012 | Boone | A61B 5/1038 |
| | | | | 29/592 |
| 2013/0130843 | A1* | 5/2013 | Burroughs | A63B 71/0686 |
| | | | | 473/415 |
| 2014/0260677 | A1* | 9/2014 | Dojan | G01L 1/2206 |
| | | | | 73/862.045 |
| 2016/0252412 | A1* | 9/2016 | McMillen | A43B 3/0005 |
| | | | | 73/774 |
| 2016/0332029 | A1* | 11/2016 | Meschter | G06F 19/3481 |
| 2017/0105476 | A1* | 4/2017 | Morrison | A43B 13/36 |
| 2017/0135607 | A1* | 5/2017 | Morris Bamberg | ........................ |
| | | | | A61B 5/1038 |
| 2017/0340049 | A1* | 11/2017 | Rice | A43B 13/386 |
| 2018/0020764 | A1* | 1/2018 | Walker | G01L 1/205 |

FOREIGN PATENT DOCUMENTS

| | | |
|---|---|---|
| KR | 10-2011-0034969 A | 4/2011 |
| KR | 10-1648270 B1 | 8/2016 |

* cited by examiner

FIG. 8B

| Parameter | Value |
|---|---|
| Step time (L) | 0.59 |
| Step time (R) | 0.54 |
| Gait cycle time (L) | 1.12 |
| Gait cycle time (R) | 1.13 |
| Swing time (L) | 0.42 |
| Swing time (R) | 0.38 |
| Stance time (L) | 0.7 |
| Stance time (R) | 0.75 |
| Single support (L) % | 34.23 |
| Single support (R) % | 37.26 |
| Double support (L) % | 28.19 |
| Double support (R) % | 28.26 |
| Ambulation time | 9.05 |
| Number of steps | 17 |

MEASURING DEVICE FOR AMBULATION DATA

CROSS-REFERENCE TO RELATED APPLICATION

This application claims priority to Korean Patent Application No. 10-2017-0099723, filed on Aug. 7, 2017, and all the benefits accruing therefrom under 35 U.S.C. § 119, the contents of which in its entirety are herein incorporated by reference.

BACKGROUND

1. Field

The present disclosure relates to a measuring device for ambulation data that can extract ambulation information by sensing a bending signal of the bottom of a shoe while walking in a non-contact manner with the underside of a foot of a walker.

2. Description of the Related Art

In general, a shoe is used to protect the foot, but recently, shoes that display walkers' ambulation information or have various types of convenient functions are being released.

Hereinafter, Utility Model Literature 1 (Korean Utility Model Publication No. 1994-0002468) discloses "multipurpose shoe with counter" in which an air pump installed in a midsole of the shoe is automatically pressed while walking, an air switch connected thereto enables a digital display to display the number of walks, and an air tube embedded in an upper cover, a sole and a side cover of the shoe protects the foot while walking.

However, Utility Model Literature 1 has very complex configuration and conducts counts using an electrical signal by connection of a terminal, and thus its downside is inaccurate counting caused by a contact fault.

Furthermore, Utility Model Literature 1 has a printed circuit board installed for electronic counting, and the printed circuit board is installed such that it is directly pressed by the underside of the foot, causing the function degradation resulting from continuous impacts due to the steps taken on the ground with the foot.

Meanwhile, in the case of conventional shoe devices with a sensor installed in shoes to acquire walkers' ambulation information, the sensor is installed such that it comes into direct contact with or is pressed by the forefoot or heel within the shoe device, causing inconvenience in use and damage caused by continuous impacts.

RELATED LITERATURES

Patent Literatures

Korean Utility Model Publication No. 1994-0002468

SUMMARY

The present disclosure is designed to solve the above problem, and therefore the present disclosure is directed to providing a measuring device for ambulation data that measures ambulation data in such a manner that a sensor does not come into direct contact with or is not directly pressed by a foot.

To achieve the object, a measuring device for ambulation data of the present disclosure includes a bending sensor installed in a bottom of a shoe to sense a bending signal transmitted by bending of the bottom of the shoe and generate a voltage signal while a user is walking, a control unit electrically connected to the bending sensor to derive an ambulation parameter by processing the outputted voltage signal, and a terminal to output the ambulation parameter transmitted from the control unit, wherein the bending sensor is placed between a part that touches a forefoot and a part that touches a heel in the bottom of the shoe.

The measuring device for ambulation data may further include an inertial measurement unit installed in the shoe to measure at least one of walking direction, walking speed and acceleration of the user, and the control unit may further derive position information of the walker based on the at least one of measured walking direction, walking speed and acceleration of the user.

The measuring device for ambulation data may further include a communication unit electrically connected to the control unit to make wireless communication with the terminal.

The bending sensor may be installed such that it is inserted into the bottom of the shoe.

The bending sensor may include a piezoelectric element to sense a bending signal by the bending of the bottom of the shoe and output a voltage signal, and a substrate installed on one surface of the piezoelectric element and electrically connected to the control unit, and the piezoelectric element and the substrate may overlap each other.

BRIEF DESCRIPTION OF THE DRAWINGS

FIG. 8B is a table showing an example of outputted ambulation parameter values.

DETAILED DESCRIPTION

Figure 1:
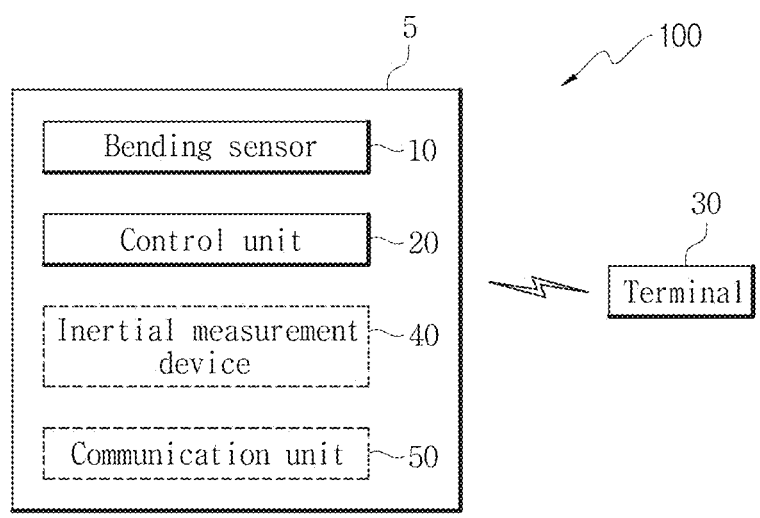
FIG. 1 is a block diagram showing a measuring device for ambulation data of the present disclosure.

Hereinafter, the embodiments disclosed herein will be described in detail with reference to the accompanying drawings, in which identical or similar reference numerals are given to identical or similar elements, and an overlapping description is omitted herein. The suffix "unit" as used herein refers to elements or components, and it is only given or interchanged in consideration of facilitation of the description, and does not itself have any distinguishable meaning or role. Furthermore, in describing the embodiments disclosed herein, when a certain description of related well-known technology is deemed to render the essential subject matter of the embodiments disclosed herein ambiguous, its detailed description is omitted herein. It should be further understood that the accompanying drawings are only provided to facilitate the understanding of the embodiments disclosed herein, and the technical spirit disclosed herein is not limited by the accompanying drawings and covers all modifications, equivalents or substituents included in the spirit and technical scope of the present disclosure.

The terms including the ordinal number such as "first", "second" and the like may be used to describe various elements, but the elements are not limited by the terms. The terms are only used to distinguish one element from another.

It will be understood that when an element is referred to as being "connected to" another element, it can be directly connected to the other element or intervening elements may be present.

As used herein, the singular forms are intended to include the plural forms as well, unless the context clearly indicates otherwise.

It will be further understood that the terms "comprises" or "includes" when used in this specification, specify the presence of stated features, integers, steps, operations, elements, components or groups thereof, but do not preclude the presence or addition of one or more other features, integers, steps, operations, elements, components, or groups thereof.

Hereinafter, a measuring device 100 for ambulation data of the present disclosure is described with reference to FIGS. 1 to 5.

Figure 2:
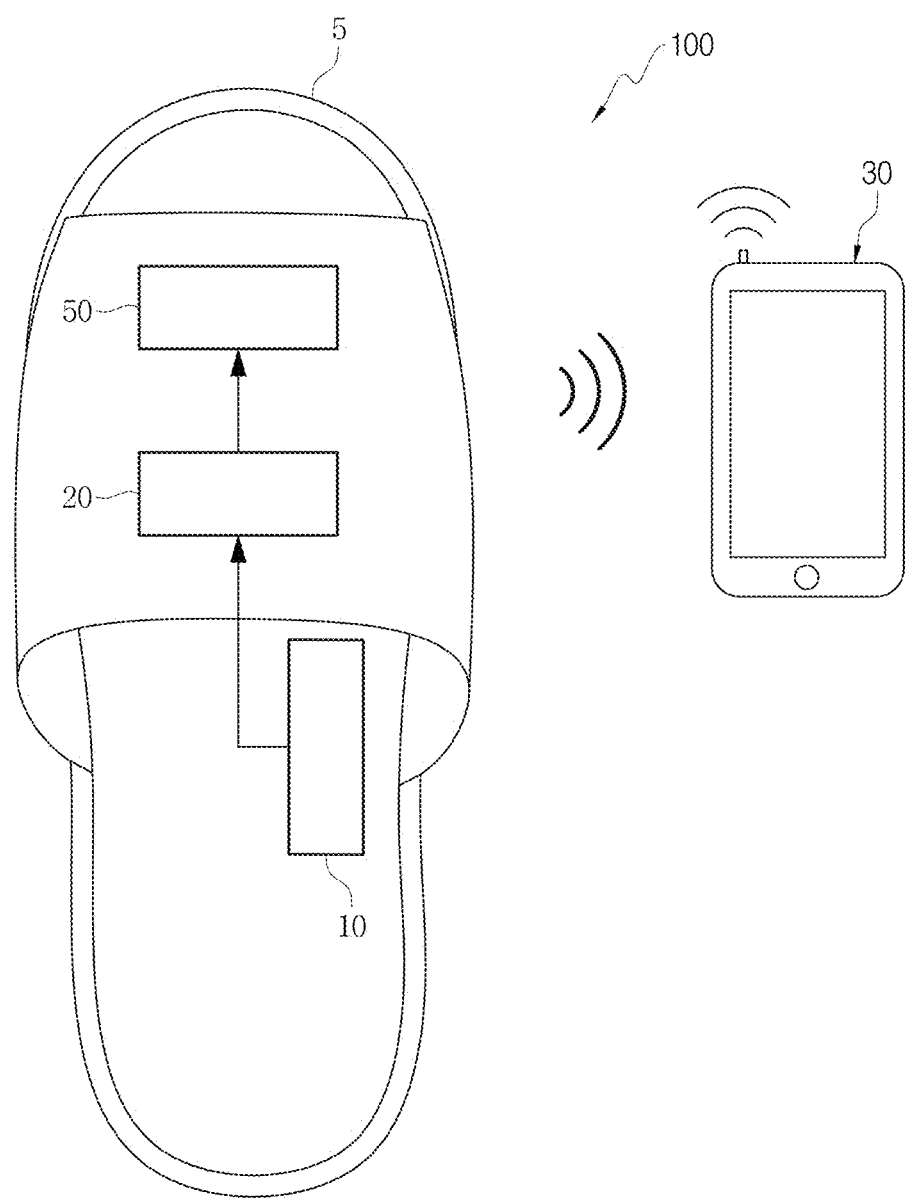
FIG. 2 is a conceptual diagram showing an example of a measuring device for ambulation data of the present disclosure.

Referring to FIGS. 1 and 2, the measuring device 100 for ambulation data of the present disclosure includes a bending sensor 10, a control unit 20, and a terminal 30.

The bending sensor 10 may be installed in the bottom of a shoe 5. The bending sensor 10 senses a bending signal transmitted by bending of the bottom of the shoe 5 and generates a voltage signal while a user is walking.

Particularly, the bending sensor 10 is placed between a part 5a that touches a forefoot 1a and a part 5b that touches a heel 1b in the bottom of the shoe 5. Preferably, the bending sensor 10 may be installed such that it is inserted into the bottom of the shoe 5 to sense a bending signal transmitted by the bending of the bottom of the shoe 5 better.

As described above, the measuring device 100 for ambulation data of the present disclosure is installed in the shoe 5 to form a non-contact structure in which the bending sensor 10 is not placed in direct contact with the forefoot 1a, the heel 1b, and an arch part therebetween. Furthermore, the bending sensor 10 indirectly senses a bending signal by the bending of the bottom of the shoe 5, without being directly pressed by the forefoot 1a, the heel 1b, or the arch part therebetween.

Figure 5:
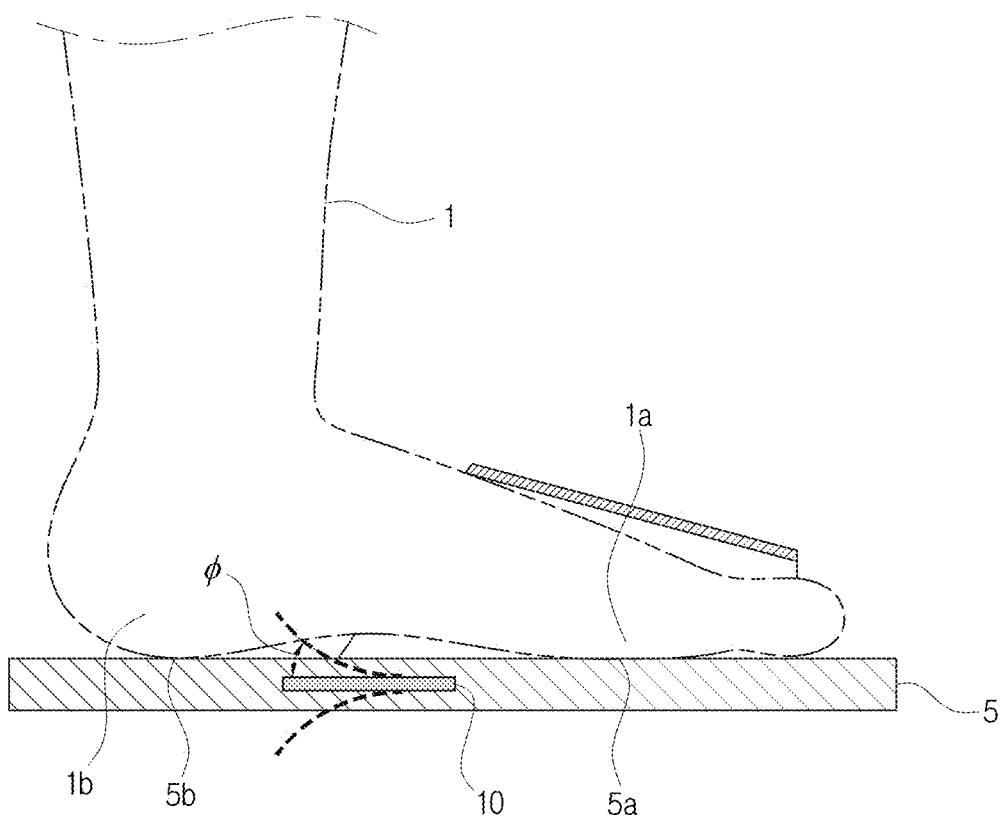
FIG. 5 is a conceptual diagram showing an example in which a foot is placed on a measuring device for ambulation data of the present disclosure.

FIG. 5 shows an example in which the bending sensor 10 is inserted into the bottom of the shoe 5 between the part 5a that touches the forefoot 1a and the part 5b that touches the heel 1b in the bottom of the shoe 5 in a non-contact manner with the underside of the foot.

This structure can solve the conventional problems with inconvenience caused by the contact of a sensor with the underside of the foot, and the risk of damage due to being directly pressed by the underside of the foot.

Figure 3:
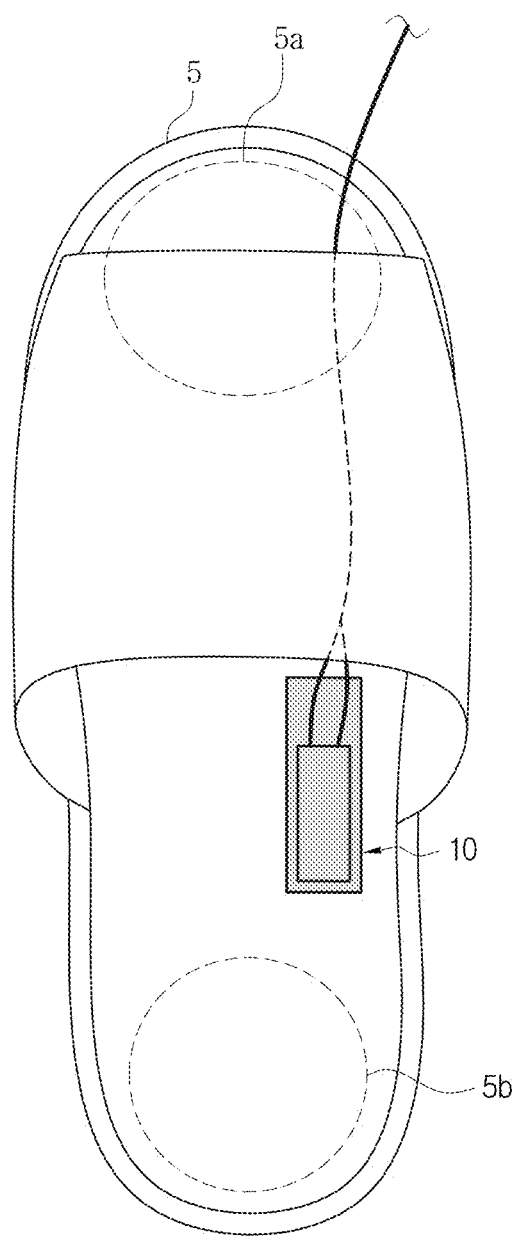
FIG. 3 is a conceptual diagram showing an example in which a bending sensor is installed in a slipper.

In the present disclosure, the bending sensor 10 is installed in the bottom of the shoe 5, and in the present disclosure, the shoe 5 may be, for example, a slipper as shown in FIGS. 2 and 3. The slipper is convenient to wear compared to a different type of shoe 5, and thus is easy for patients or senior citizens to use. Furthermore, the slipper is more prone to bending at the bottom compared to a different type of shoe 5, thus acquires a larger bending signal than a different type of shoe 5, and can easily derive an ambulation parameter. A further detailed structure of the bending sensor 10 will be described below.

The control unit 20 is electrically connected to the bending sensor 10 to receive the voltage signal outputted from the bending sensor 10 and processes the voltage signal to derive an ambulation parameter.

The ambulation parameter may include one-foot data acquired from only one foot of the walker, two-feet data acquired from two feet of the walker, and inertial measurement data acquired from an inertial measurement unit 40 as described below.

The one-foot data may include the gait cycle time, stance time, and swing time.

The gait cycle time is the time period from the time at which the foot makes contact in a first step to the time at which the same foot makes contact in a second step. The stance time is the time period during which the foot is in contact with the ground. The swing time is the time period from the time at which the foot is off the ground from the time at which the foot contacts the ground again.

The two-feet data may include the step time, ambulation time, single support, double support, and number of steps.

The step time is the time period from the time at which a previous foot makes contact in a third step to the time at which the other foot makes contact in a fourth step, and the ambulation time is the time period from the time at which a first foot makes contact to the time at which a last foot makes contact. Furthermore, the single support is a ratio of the time period during which one foot is in contact with the ground, and the double support is a ratio of the time period during which two feet are all in contact with the ground. The number of steps is how many steps are taken.

The inertial measurement unit (IMU) data may include the step length, stride length, and walking speed.

The step length is the distance from the center of the heel when a previous foot of the two feet contacts the ground to the center of the heel when the other foot contacts the ground, and the stride length is the distance from heel to heel between two steps with respect to the same foot.

Furthermore, the control unit 20 may further derive position information of the walker, and its description will be provided below in the description part of the inertial measurement unit 40.

The control unit 20 may be, for example, a micro controller unit (MCU).

The terminal 30 outputs the ambulation parameter transmitted from the control unit 20. For example, the terminal 30 may have a display unit to output the ambulation parameter. Furthermore, the terminal 30 may receive the bending signal and the voltage signal from the control unit 20 or the bending sensor 10, and output it through the display unit.

For example, the terminal 30 as stated herein refers to a mobile terminal possessed by the user (a mobile phone, a smartphone, a laptop computer, a personal digital assistant (PDA), a portable multimedia player (PMP), a slate PC, a tablet PC, and an ultrabook).

The terminal 30 can make wired or wireless communication with the control unit 20. When the terminal 30 makes wireless communication with the control unit 20, the measuring device 100 for ambulation data of the present disclosure may further include a communication unit 50 electrically connected to the control unit 20 to make wireless communication with the terminal 30.

When the control unit 20 makes wireless communication with the terminal 30 through the communication unit 50, the ambulation parameter derived from the control unit 20 and the bending signal and the voltage signal from the bending sensor 10 may be transmitted to the terminal 30.

To this end, the terminal 30 may have a receiving unit (not shown) to receive the signal transmitted from the communication unit 50.

The measuring device 100 for ambulation data of the present disclosure may further include the inertial measurement unit 40. The inertial measurement unit 40 may be installed in the shoe 5 to measure at least one of walking direction, walking speed and acceleration of the user. Furthermore, the inertial measurement unit 40 is electrically connected to the control unit 20 to provide the control unit 20 with the walking direction, walking speed and acceleration information of the user, and the control unit 20 may derive position information of the walker based on the provided walking direction, walking speed and acceleration information of the user.

Figure 4:
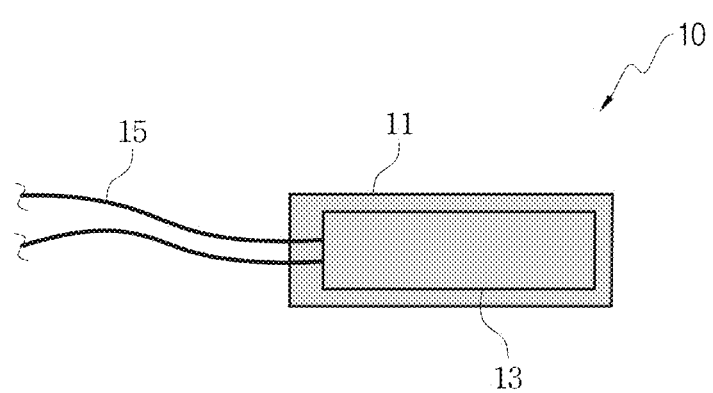
FIG. 4 is a plane view showing a bending sensor.

Meanwhile, the bending sensor 10 may include a piezoelectric element 11 and a substrate 13. For example, as shown in FIG. 4, the bending sensor 10 may be configured such that the piezoelectric element 11 and the substrate 13 overlap.

The "piezoelectric element" refers to a material that generates electricity in response to physical displacement occurred by the application of stress.

In the present disclosure, for the piezoelectric element 11, polyvinylidene fluoride (PVDF) known as having excellent flexible property among piezoelectric materials is used. With the piezoelectric element 11 of flexible property, when the forefoot or heel presses the bottom of the shoe 5 while the walker is walking, the shoe 5 is subjected to a force acting downward and a force tending towards, and then the bottom of the shoe 5 is bent. As the piezoelectric element 11 produces electricity, the piezoelectric element 11 serves as an energy converter that converts energy transmitted to the foot by the walking of the walker to electrical energy. It should be noted that in addition to PVDF, various piezoelectric materials having predetermined flexibility may be used for the piezoelectric element 11.

The PVDF piezoelectric element 11 is adhered to the Mylar substrate 13 using an adhesive such as epoxy.

The reason that the area of the piezoelectric element 11 is slightly larger than the area of the substrate 13 is to facilitate the attachment of electrode to the piezoelectric element 11, and two electrodes (not shown) are each applied to upper and lower surfaces of one end of the piezoelectric element 11, and each electrode is connected to an electrical wire 15.

The electrical wire 15 is embedded in the bottom of the shoe 5 and connected to the control unit 20, and electrically connects the bending sensor 10 and the control unit 20.

Referring to FIGS. 6 to 8B, shown is the bending angle and the voltage signal measured by the measuring device 100 for ambulation data of the present disclosure while the walker is walking, and the ambulation parameter value derived therefrom.

Figure 6:
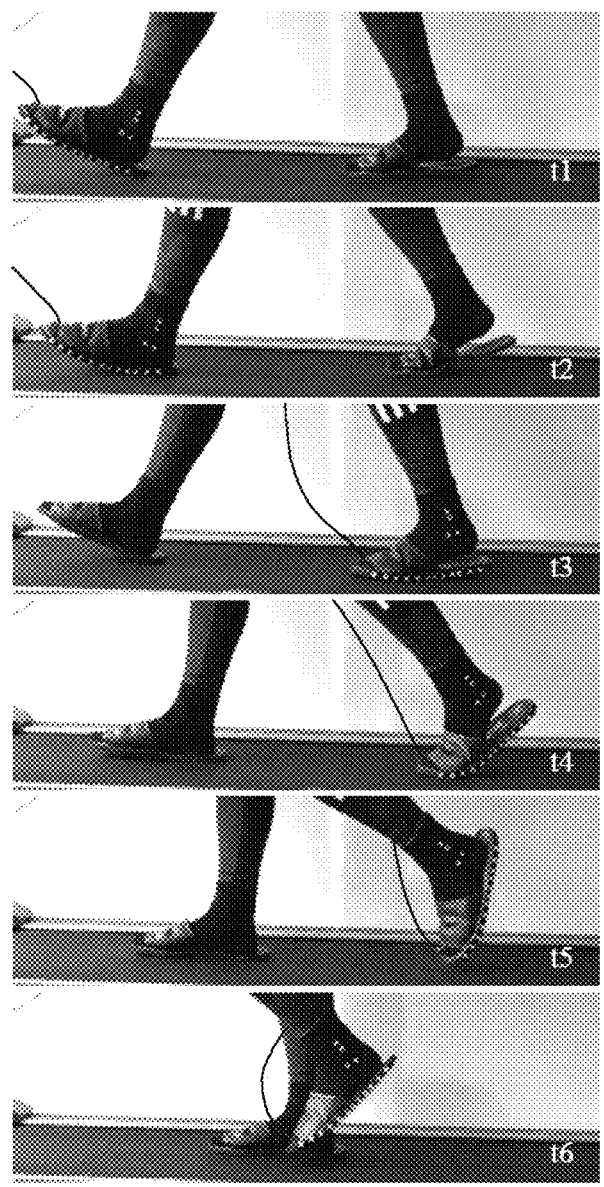
FIG. 6 is a photographic image showing an example of a walker's ambulation at t1 to t6.
Figure 7A:
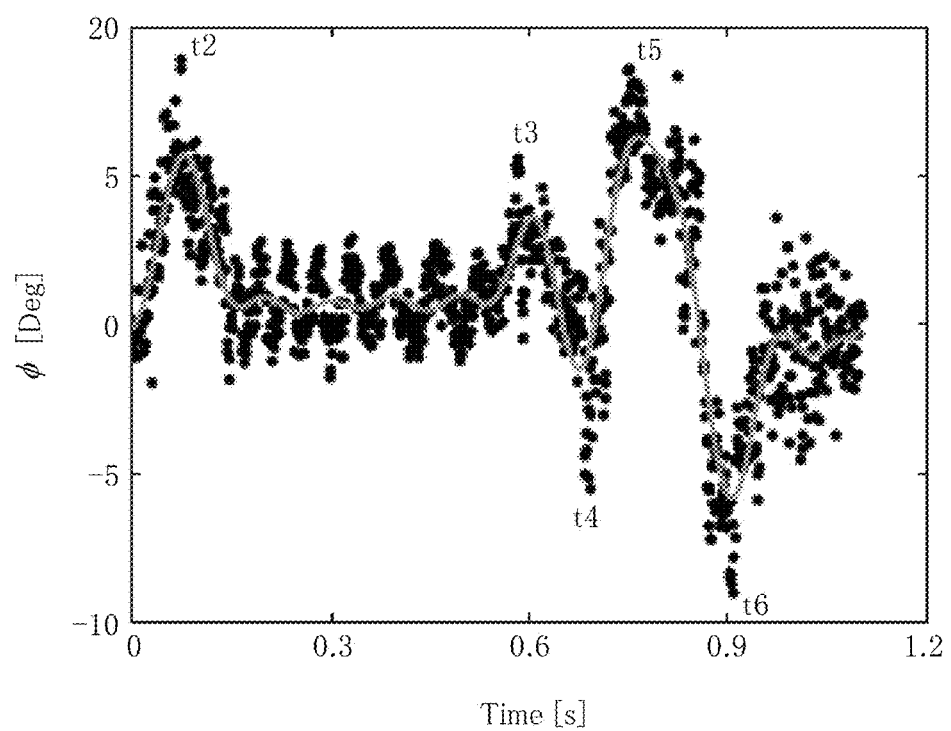
FIG. 7A is a graph showing the bending angle over time.
Figure 7B:
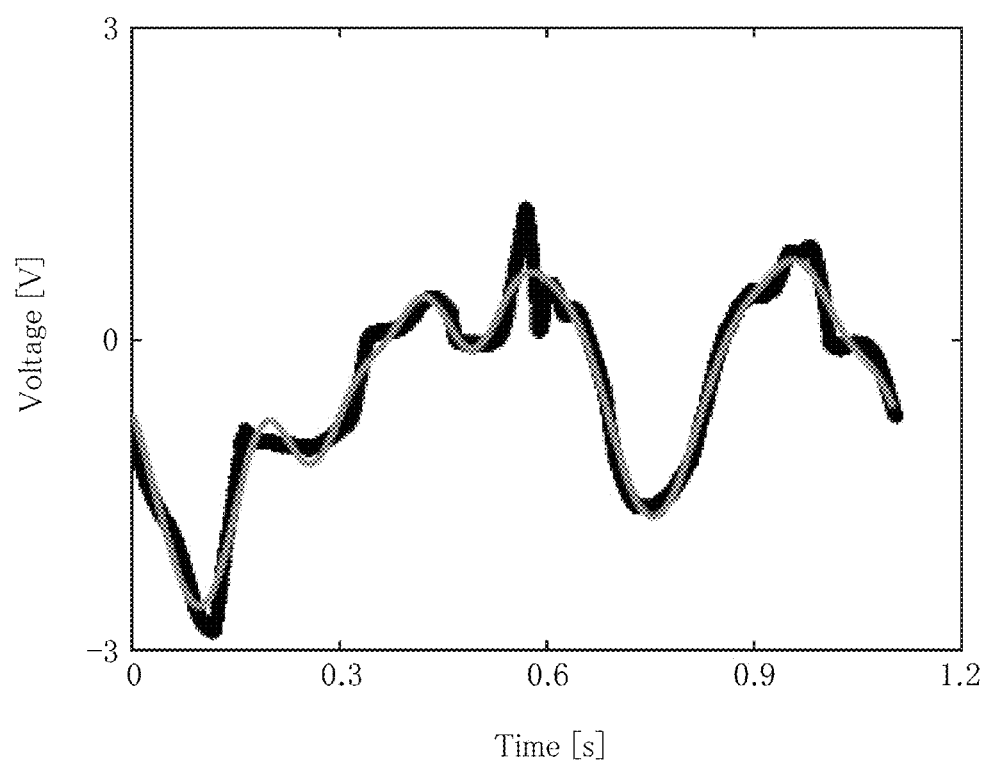
FIG. 7B is a graph showing voltage by the bending angle of FIG. 7A.

FIG. 6 is a photographic image showing an example of the walker's ambulation at t1 to t6, and the angle at which the bending sensor 10 is bent at t1 to t6 is shown in FIG. 7A, and the voltage signal by the bending at the angle of FIG. 7A is shown in FIG. 7B.

Figure 8A:
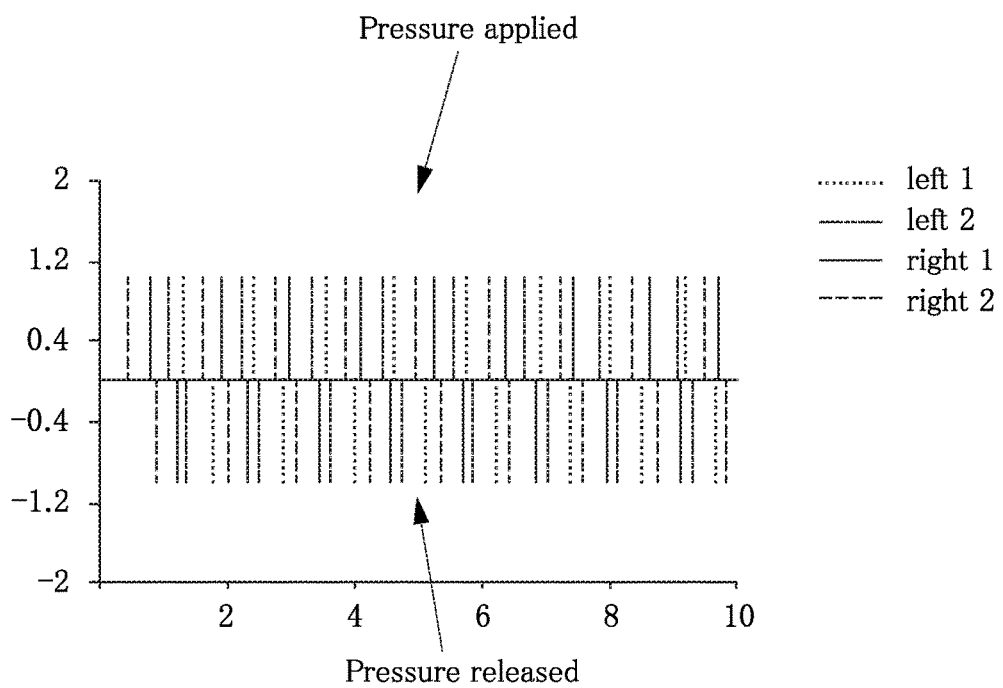
FIG. 8A is a graph showing voltage when a bending sensor is pressed and the applied pressure is released while a walker is walking.

Meanwhile, FIG. 8A shows an example in which the bending sensor 10 is pressed and the applied pressure is released while the walker is walking, wherein Left 1 denotes the forefoot of the left foot, Left 2 denotes the heel of the left foot, Right 1 denotes the forefoot of the right foot, and Right 2 denotes the heel of the right foot. Seeing FIG. 8A, when ambulation starts, the heel and forefoot of the right foot and the heel and forefoot of the left foot contact the ground, applying the pressure, and the applied pressure is released when off the ground.

Referring to FIG. 8B, ambulation is performed in 17 steps for the ambulation time of 9.05 seconds, and Table shows an example of ambulation parameter values: step time (L) of 0.59 seconds, step time (R) of 0.54 seconds, gait cycle time (L) of 1.12 seconds, gait cycle time (R) of 1.13 seconds, swing time (L) of 0.42 seconds, swing time (R) of 0.38 seconds, stance time (L) of 0.7 seconds, step time (R) of 0.75 seconds, single support (L) of 34.23%, single support (R) of 37.26%, double support (L) of 28.19%, and double support (R) of 28.26%.

Meanwhile, the measuring device 100 for ambulation data of the present disclosure may be applied to smart shoes for extraction of ambulation information or monitoring systems for patients requiring continuous ambulation observation in hospitals.

The measuring device for ambulation data of the present disclosure has the bending sensor placed between the part that touches the forefoot and the part that touches the heel in the bottom of the shoe, thereby reducing the inconvenience caused by the contact of a contact sensor with the underside of the foot in the conventional art.

Furthermore, the measuring device for ambulation data of the present disclosure prevents the bending sensor from being damaged, because the bending sensor is placed in non-contact with the underside of the foot, and thus bending sensor is not directly pressed by the underside of the foot.

The measuring device 100 for ambulation data as described above is not limited to the configuration and method of the embodiments described above, and some or all of the embodiments may be selectively combined to make various modifications.

It is obvious to those skilled in the art that the present disclosure may be embodied in another specific form without departing from the spirit and essential feature of the present disclosure. Therefore, it should be noted that the detailed description is for illustration only, but not intended to limiting in all aspects. The scope of the present disclosure should be determined by the reasonable interpretation of the appended claims, and all modifications within the equivalent scope of the present disclosure falls in the scope of the present disclosure.

DETAILED DESCRIPTION OF MAIN ELEMENTS

100: Measuring device for ambulation data
1: Foot 1a: Forefoot 1b: Heel
5: Shoe 5a: Part that touches forefoot 5b: Part that touches heel
10: Bending sensor
20: Control unit
30: Terminal
40: Inertial measurement unit
50: Communication unit

What is claimed is:

1. A measuring device for ambulation data, comprising:
a bending sensor installed in a bottom of a shoe to sense a bending signal transmitted by bending of the bottom of the shoe and generate a voltage signal while a user is walking, the bending sensor including
a piezoelectric element to sense the bending signal, and a substrate installed on a surface of the piezoelectric element,
wherein the piezoelectric element and the substrate overlap each other and an area of the piezoelectric element is greater than an area of the substrate;
a control unit electrically connected to the bending sensor to derive an ambulation parameter by processing the outputted voltage signal;
an inertial measurement unit installed in the shoe separately from the bending sensor and measuring at least one of walking direction, walking speed and acceleration of the user; and
a terminal to output the ambulation parameter transmitted from the control unit and the inertial measurement unit,
wherein the bending sensor is placed at a middle portion of the bottom of the shoe between a toe part and a heel part of the shoe such that the bending sensor is placed under an arch part of the user's foot and not directly pressed by a forefoot and a heel of the user.

2. The measuring device for ambulation data according to claim 1,
wherein the control unit further derives position information of the user based on the at least one of measured walking direction, walking speed and acceleration of the user.

3. The measuring device for ambulation data according to claim 1, further comprising:
a communication unit electrically connected to the control unit to make wireless communication with the terminal.

4. The measuring device for ambulation data according to claim 1, wherein the bending sensor is installed such that it is inserted into the bottom of the shoe.

* * * * *